US012475242B2

(12) United States Patent
Grossman et al.

(10) Patent No.: US 12,475,242 B2
(45) Date of Patent: Nov. 18, 2025

(54) AUTOMATIC MANAGEMENT OF USER PERMISSIONS (71) Applicant: VARONIS SYSTEMS, INC.

(72) Inventors: Igor Grossman, Even-Yehuda (IL); John Eugene Neystadt, Kfar-Saba (IL); Evgeny Gilgurt, Ramat Gan (IL); Lior Chen, Tel Mond (IL); David Bass, Karmei Yosef (IL)

(73) Assignee: VARONIS SYSTEMS, INC., New York, NY (US)

( * ) Notice: Subject to any disclaimer, the term of this patent is extended or adjusted under 35 U.S.C. 154(b) by 365 days.

(21) Appl. No.: 18/078,259

(22) Filed: Dec. 9, 2022

(65) Prior Publication Data
US 2024/0193290 A1 Jun. 13, 2024

(51) Int. Cl.
G06F 21/62 (2013.01)
G06F 18/2132 (2023.01)
G06F 18/22 (2023.01)
G06F 18/2413 (2023.01)
G06F 21/50 (2013.01)

(52) U.S. Cl.
CPC ...... *G06F 21/6218* (2013.01); *G06F 18/2132* (2023.01); *G06F 18/22* (2023.01); *G06F 18/24147* (2023.01); *G06F 21/50* (2013.01); *G06F 2221/2141* (2013.01)

(58) Field of Classification Search
USPC ........................................................ 726/27
See application file for complete search history.

(56) References Cited

U.S. PATENT DOCUMENTS

| | | | | |
|---|---|---|---|---|
| 2006/0053216 A1* | 3/2006 | Deokar | ................. | G06F 15/173 709/223 |
| 2007/0150572 A1* | 6/2007 | Cox | ........................ | H04L 43/00 709/223 |
| 2010/0223618 A1* | 9/2010 | Fu | .......................... | G06F 9/5077 718/102 |
| 2015/0370972 A1* | 12/2015 | Chaudhri | ............... | G16H 10/60 705/2 |
| 2019/0327271 A1* | 10/2019 | Saxena | ................... | H04L 41/16 |

OTHER PUBLICATIONS

An International Search Report and a Written Opinion both dated Feb. 23, 2024, which issued during the prosecution of Applicant's PCT/IL2023/051165.

* cited by examiner

*Primary Examiner* — Sanchit K Sarker
(74) *Attorney, Agent, or Firm* — Sughrue Mion, PLLC (57) ABSTRACT A method for automatic management of user permissions in an organization including automatically grouping users into a plurality of user clusters based on at least one similarity between users in each user cluster, for each user cluster, automatically generating a set of cluster user permissions, the set of cluster user permissions including user permissions belonging to users in the cluster and actively used by at least one user in the cluster and for each user cluster, automatically modifying user permissions of each user in each cluster in accordance with the set of cluster user permissions.

20 Claims, 5 Drawing Sheets

AUTOMATIC MANAGEMENT OF USER PERMISSIONS

FIELD OF THE INVENTION

The present invention relates generally to security controls for computer networks and more specifically to automated systems and methods for management of user permissions in computer networks.

BACKGROUND OF THE INVENTION

Various types of systems and methods for automatic management of user permissions in computer networks are known in the art.

SUMMARY OF THE INVENTION

The present invention seeks to provide improved automated systems and methods relating to management and up-to-date maintenance of appropriate user permissions in organizations, based on user similarity.

There is thus provided in accordance with a preferred embodiment of the present invention a method for automatic management of user permissions in an organization including automatically grouping users into a plurality of user clusters based on at least one similarity between users in each user cluster, for each user cluster, automatically generating a set of cluster user permissions, the set of cluster user permissions including user permissions belonging to users in the cluster and actively used by at least one user in the cluster and for each user cluster, automatically modifying user permissions of each user in each cluster in accordance with the set of cluster user permissions.

Preferably, the at least one similarity includes a similarity in access permissions of the users and a similarity in resources accessed by the users, via the access permissions.

Preferably, the automatically grouping includes generating a first matrix representing access permissions associated with each user, generating a second matrix representing resources accessed by each user during a predetermined period of time preceding the grouping and grouping the users into the user clusters based on combining the first and second matrices.

Preferably, the combining includes finding distances between respective ones of the users in the first matrix, finding distances between respective ones of the users in the second matrix, combining the distances between the respective ones of the users in the first and second matrices, thereby generating a third distance matrix representing combined distances between respective ones of the users in the first and second matrices and grouping the users into the user clusters based on the combined distances in the third distance matrix.

In accordance with a preferred embodiment of the present invention, the combining the distances includes a weighted combining, wherein a greater weight is given to the distances between respective ones of the users in the second matrix in comparison to the first matrix.

Preferably, the access permissions associated with each user include at least one of direct access permissions and membership of user access groups.

Preferably, the method also includes, prior to the generating the first and second matrices, obtaining data relating to the users and to activity of the users with respect to the resources over the period of time preceding the grouping and unifying the data relating to the users, in order to avoid user duplication.

Preferably, the unifying is based on comparing unique user identifiers between the users, including at least one of user names, user email addresses and user phone numbers.

Preferably, the modifying user permissions includes at least one of granting or revoking user permissions so as to be in accordance with the set of cluster user permissions and adjusting a level of the user permissions so as to be in accordance with the set of cluster user permissions.

In accordance with another preferred embodiment of the present invention, the modifying user permissions includes creating a new cluster having the set of cluster user permissions and populating the new cluster with the users to which the set of cluster user permissions is applicable.

There is additionally provided in accordance with another preferred embodiment of the present invention a method for management of user permissions including automatically grouping users into a plurality of user clusters based on a similarity between users in each user cluster, for each user cluster, automatically generating a set of cluster user permissions, the set of cluster user permissions including user permissions belonging to users in the cluster and actively used by at least one user in the cluster and for each user cluster, automatically providing a user-sensible output including a recommendation to modify user permissions of each user in accordance with the set of cluster user permissions.

There is furthermore provided in accordance with yet another preferred embodiment of the present invention a system for automatic management of user permissions in an organization including a cluster generation module operative to automatically group users into a plurality of user clusters based on at least one similarity between users in each user cluster, a cluster permission generation module operative, for each user cluster, to automatically generate a set of cluster user permissions, the set of cluster user permissions including user permissions belonging to users in the user cluster and actively used by at least one user in the cluster and a user permission modification module operative, for each user cluster, to automatically modify user permissions of each user in each cluster in accordance with the set of cluster user permissions.

Preferably, the at least one similarity includes a similarity in access permissions of the users and a similarity in resources accessed by the users, via the access permissions.

Preferably, the cluster generation module is operative to generate a first matrix representing the access permissions associated with each user, generate a second matrix representing the resources accessed by each user during a predetermined period of time and group the users into the user clusters based on a combination of the first and second matrices.

Preferably, the cluster generation module is further operative to find distances between respective ones of the users in the first matrix, find distances between respective ones of the users in the second matrix, combine the distances between the respective ones of the users in the first and second matrices, thereby generating a third distance matrix representing combined distances between respective ones of the users in the first and second matrices and group the users into the user clusters based on the combined distances in the third distance matrix.

In accordance with a preferred embodiment of the system of the present invention, the cluster generation module is operative to combine the distances in a weighted manner, wherein a greater weight is given to the distances between respective ones of the users in the second matrix in comparison to the first matrix.

Preferably, the access permissions associated with each user include at least one of direct access permissions and membership of user access groups.

Preferably, the cluster generation module is additionally operative to obtain data relating to the users and to activity of the users with respect to the resources over the period of time preceding the grouping and unify the data relating to the users, in order to avoid user duplication.

Preferably, the user permission modification module is operative to at least one of grant or revoke user permissions so as to be in accordance with the set of cluster user permissions and adjust a level of the user permissions so as to be in accordance with the set of cluster user permissions.

In accordance with another preferred embodiment of the system of the present invention, the user permission modification module is operative to modify the user permissions by creating a new cluster having the set of cluster user permissions and to populate the new cluster with the users to which the set of cluster user permissions is applicable.

BRIEF DESCRIPTION OF THE DRAWINGS

The present invention will be understood and appreciated more fully based on the following detailed description taken in conjunction with the drawings in which.

DETAILED DESCRIPTION OF PREFERRED EMBODIMENTS

Figure 1:
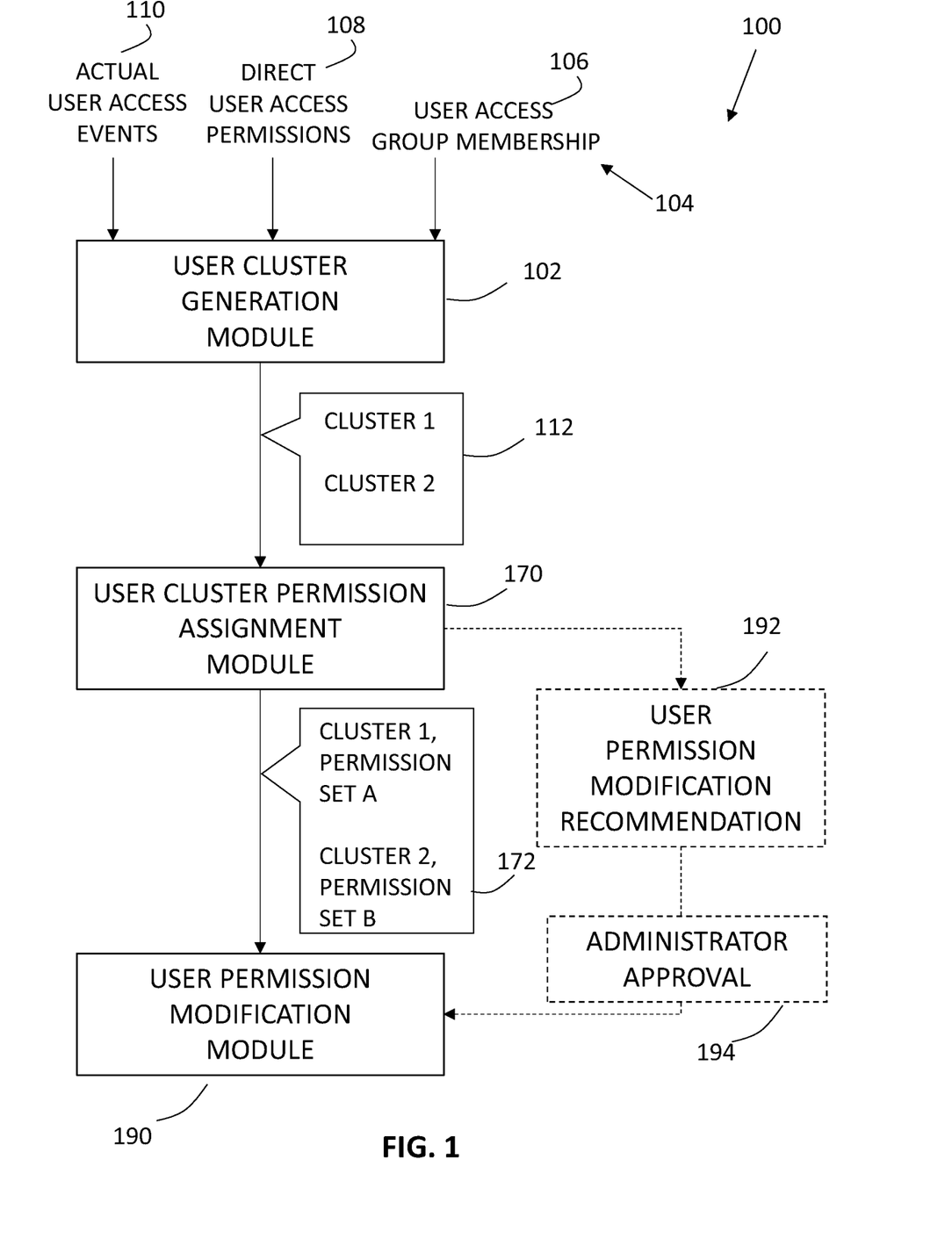
FIG. 1 is a simplified block diagram illustration of a system for automatic user permission management, constructed and operative in accordance with a preferred embodiment of the present invention.

Reference is now made to FIG. 1, which is a simplified block diagram illustration of a system for automatic user permission management, constructed and operative in accordance with a preferred embodiment of the present invention.

As seen in FIG. 1, there is provided a system 100 for automatic management of user access permissions. System 100 is preferably operative to automatically manage access permissions of users to computer resources in an organization, in order to ensure that user access permissions are maintained in an up-to-date manner. System 100 may be operative to automatically remove superfluous access permissions, add required access permissions and/or adjust levels of access permissions of users. Such adjustments to user access permissions are typically necessitated on an ongoing basis in organizations due to the dynamic nature of users' roles and tasks. In the absence of such adjustments to user access permissions, users may retain inappropriately broad and redundant access permissions to sensitive data, thereby creating a security risk and furthermore, users may not be granted access permissions required in order to perform new or changing tasks.

System 100 preferably automatically manages access permissions by grouping users into user clusters, based on at least one similarity between users in each cluster, and then assigning permissions to each individual cluster, based on access permissions belonging to members of the cluster and actively used by at least one member of the cluster. Advantageously, system 100 may run continuously, thus continuously automatically updating access permissions of users, preferably on a periodic basis.

System 100 preferably includes a user cluster generation module 102, for grouping users into clusters, based on user similarity. User cluster generation module 102 is preferably provided with data 104 relating to users. User data 104 may include data relating to a multiplicity of users across diverse services within an organization. User data 104 preferably includes data relating to access permissions of users. This data may be in the form of data 106 indicating user membership of access groups within the organization. This data may additionally be in the form of data 108 indicating direct user access permissions to computer resources within the organization. Data indicating access permissions of users, such as data 106 and 108, may be provided to user cluster generation module 102 by a domain controller within a computer network of the organization.

User data 104 additionally preferably includes data 110 indicating actual user access events. Data 110 may indicate resources upon which users perform actions, such as computer files, records, chats in messenger services, or other relevant resources. Data 110 may be provided to user cluster generation module 102, by way of example only, by a cloud service or by an agent providing such data to a cloud service.

User data 104 further preferably includes data identifying users, such as user email addresses, names, phone numbers, home addresses or organizational departments. Such data may be useful within system 100 in order to identify and unify same users from more than one service within the organization, as is explained in further detail henceforth with respect to FIG. 2A.

Data 106 and 108 indicating user access permissions and data 110 indicating actual user access events are preferably combinedly employed by user cluster generation module 102 in order to find similarities between users and to group users into clusters based on the similarities found therebetween. Users having greatest similarity therebetween based on a combination of user access permissions and actual user access events are preferably united into clusters, such as cluster 1, cluster 2 etc., as indicated at an output 112 of user cluster generation module 102.

During initial deployment of system 100, user data 104 is preferably provided to user cluster generation module 102 over an initial learning period, such as for example three months, and the clustering of users into groups performed based on data received over the learning period. Following the initial learning period, during subsequent operation of system 100, data 104 may be collected at regular time intervals. Additionally or alternatively, data 104 may be collected at user-specified time intervals or particular points in time, for example in response to restructuring of roles within an organization.

Figure 2A:
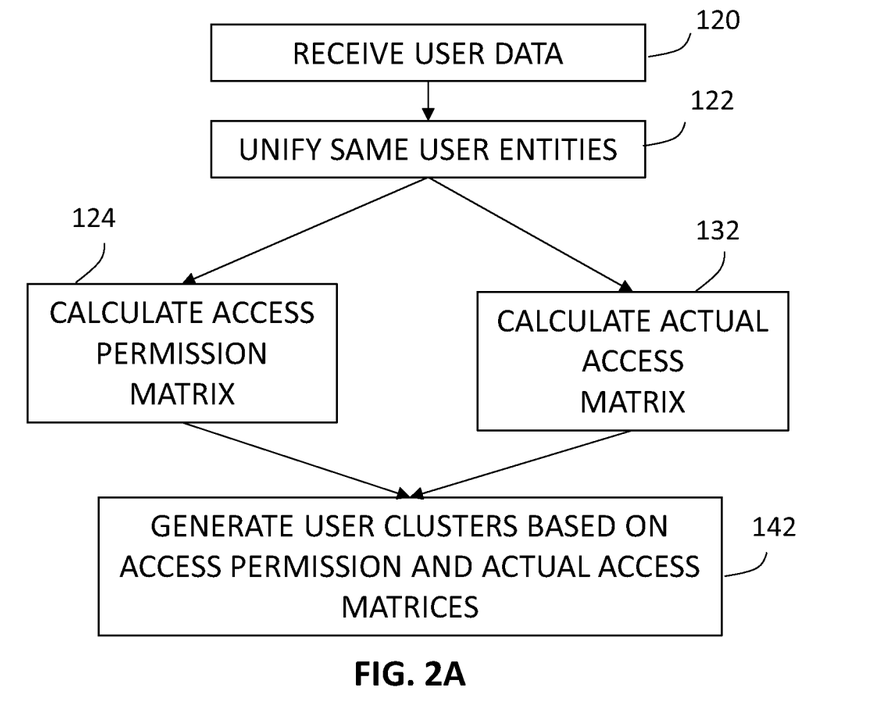
FIGS. 2A and 2B are simplified flow charts illustrating cluster generating functionality of a system of the type shown in FIG. 1.
Figure 2B:
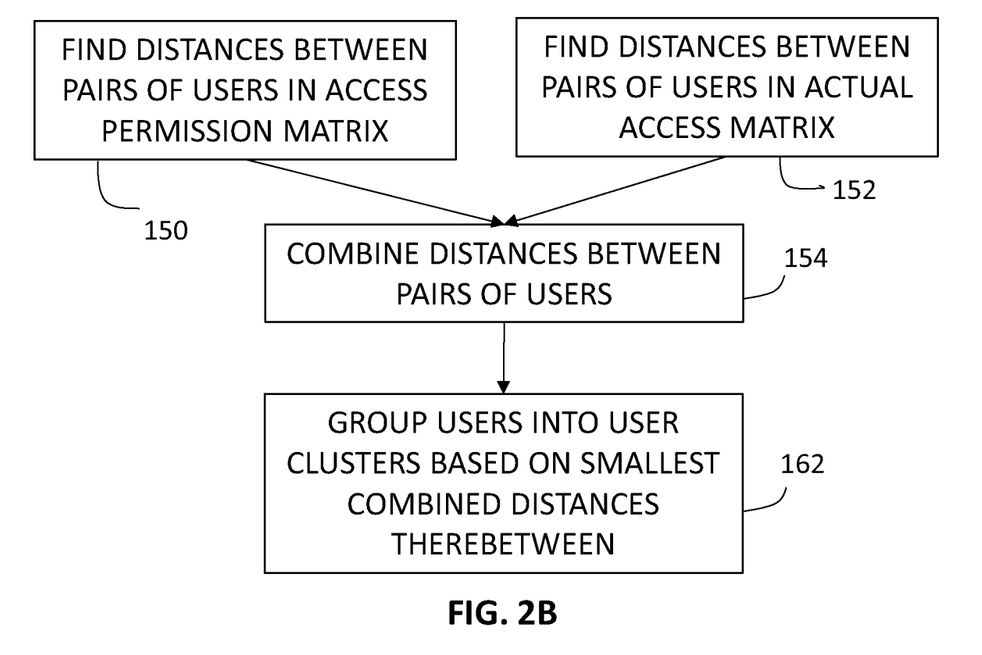

The cluster generating functionality of the present invention, according to one preferred embodiment thereof, may be better understood with reference to the operational flow charts of FIGS. 2A and 2B. It is understood that the cluster generating functionality shown in FIGS. 2A and 2B may be performed by user cluster generation module 102, such as shown in FIG. 1.

Turning first to FIG. 2A, as seen at a first step 120, user data is received. For example, as detailed hereinabove with respect to FIG. 1, the user data may comprise user data 110. Particularly preferably, the user data includes data relating to user access permissions, such as data 106 and 108, data relating to actual access events of the users, such as data 110, and data relating to the users themselves, such as data identifying users including names, home addresses, email addresses, telephone numbers, organizational department etc.

As seen at a second step 122, same user entities are preferably unified in order to unite diverse data as belonging to a single user. This is particularly relevant in multi-service organizations, where users may belong to more than one service or department, and data relating to the same user may be collected across multiple services. Unification of user entities may be based on one or more user identifiers, such as a combination of first and last name and phone numbers, or simply on a user email address. Unification of user entities may optionally involve manual validation of user identification by a system administrator.

Based on access group memberships, as indicated by data 106, and/or direct access permissions as indicated by data 108, an access permission matrix may be found, as seen a third step 124. The access permission matrix correlates between users and the access groups of which the user is a member and/or resources to which the user has access.

Figure 3A:
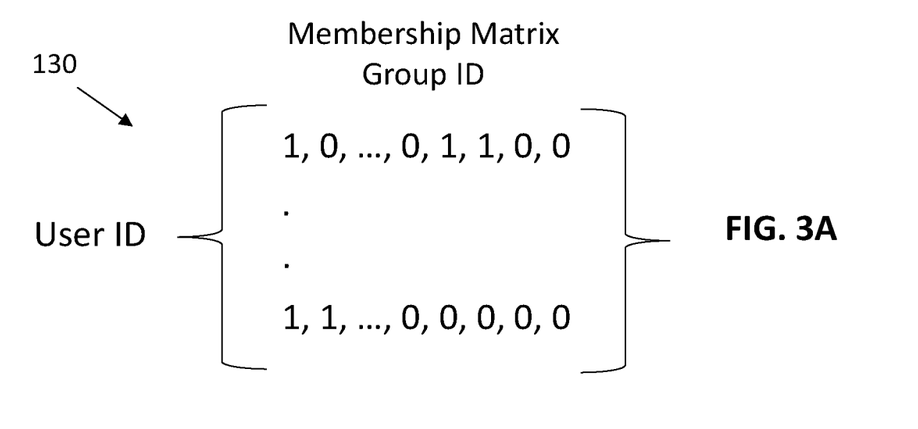
FIGS. 3A, 3B and 3C are examples of simplified matrices as may be calculated as a part of the cluster generating functionality of the type shown in FIGS. 2A and 2B

A highly simplified example of an access permission matrix 130 based on user access group membership is shown in FIG. 3A. As seen in FIG. 3A, access permission matrix 130 comprises rows of users arranged by user identification (ID) and columns of access groups, arranged by access group ID. Access permission matrix 130 is, in this case, a binary matrix, wherein an entry of 0 indicates that a given user is not a member of a given access group and an entry of 1 indicates that a given user belongs to a given access group.

Additionally, based on actual access events with respect to resources, as indicated by data 110, an actual access matrix may be found, as seen at a fourth step 132. It is appreciated that third and fourth steps 124 and 132 for calculating the access permission matrix and actual access matrix respectively may be performed sequentially, concurrently and in any order with respect to one another. The actual access matrix correlates between users and resources actually accessed thereby during a learning period preceding calculation of the matrix. Actual access to resources may include access to resources without changing resources such as read operations, or access to resources involving changing resources, such as read and write operations by a user.

Figure 3B:
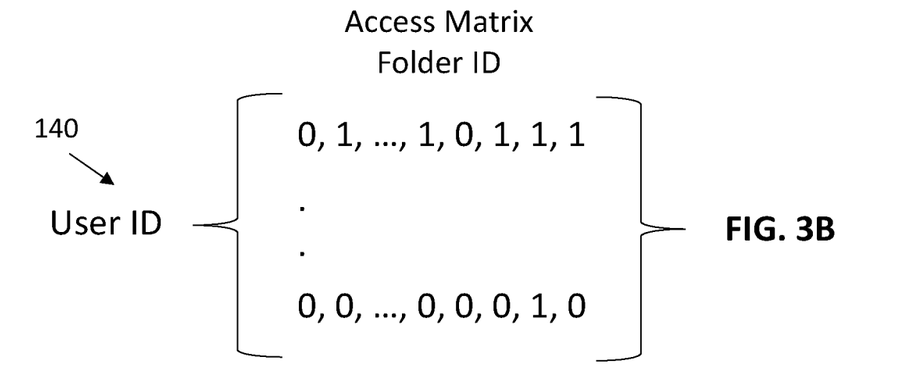

A highly simplified example of an actual access matrix 140 based on actual user access to computer folders is shown in FIG. 3B. As seen in FIG. 3B, actual access matrix 140 comprises rows of users arranged by user identification (ID) and columns of folders, arranged by folder ID. Actual access matrix 140 is, in this case, a binary matrix, wherein an entry of 0 indicates that a given user did not access a given folder during the learning period preceding calculation of the matrix and an entry of 1 indicates that a given user did access the given folder.

As seen at a fifth step 142, users are preferably grouped into user clusters based on similarities between users, based on a combination of the access permission and actual access matrices. Users having greatest similarity to one another are preferably considered to belong to a single cluster. Multiple clusters may be generated by grouping different sets of users having greatest similarity to one another. In one preferred embodiment of the present invention, a user is placed in only one cluster. In another preferred embodiment of the present invention, a user may be placed in more than one cluster.

A variety of calculations may be used to cluster together mutually similar users, based on similarity in access permissions and actual access events thereof. A possible exemplary approach is illustrated in FIG. 2B. However, it is appreciated that the method of FIG. 2B is just one possible implementation of fifth step 142 of FIG. 2A for grouping users into clusters and that other approaches are also possible.

Turning now to FIG. 2B, user similarity may be calculated at a first step 150 by finding distances between pairs of users in access permission matrix 130 and at a second step 152 by finding distances between pairs of users in actual access matrix 140. The pairs of users may include all possible pairs of users represented in the two matrices 130 and 140. It is understood that first and second steps 150 and 152 are referred to as 'first' and 'second' for ease of reference only and that the two steps may be performed concurrently or in any suitable time relationship with respect to one another.

For example in the case of a user A and a user B, a distance between user A and user B may be found in access permission matrix 130 and represented as AccessPermissionMatrixDist (A, B). Furthermore, a distance between user A and user B may be found in actual access matrix 140 and represented as ActualAccessMatrixDist (A, B). The distance between the users may be calculated in accordance with any suitable similarity metric. By way of example only, the distance between two vectors in each of the matrices may be calculated and expressed as a value ranging from 0 (no distance) to 1. A variety of approaches may be used to find the distance between vectors, such as, by way of example, a cosine similarity calculation.

The total distance (A, B) between user A and user B may then be found at a third step 154 by combining distances between the users as found in each of the matrices. By way of example, a weighted combination of AccessPermissionMatrixDist (A, B) and ActualAccessMatrixDist (A, B) may be found, in accordance with:

$$\text{TotalDist}(A,B) = w_1 * \text{AccessPermissionMatrixDist}(A,B) + w_2 * \text{ActualAccessMatrixDist}(A,B) \tag{1}$$

wherein $w_1$ and $w_2$ are weights, the sum of which is unity.

In accordance with a particularly preferred embodiment of the present invention, a greater weight is assigned to distances between users in actual access matrix 140 as compared to the weight assigned to distances between users in the access permission matrix 130. In the above example, $w_1$ is preferably much greater than $w_2$. By way of example only, $w_1$ may be equal to 0.8 and $w_2$ may be equal to 0.2, although it is appreciated that other values for $w_1$ and $w_2$ are possible.

Figure 3C:
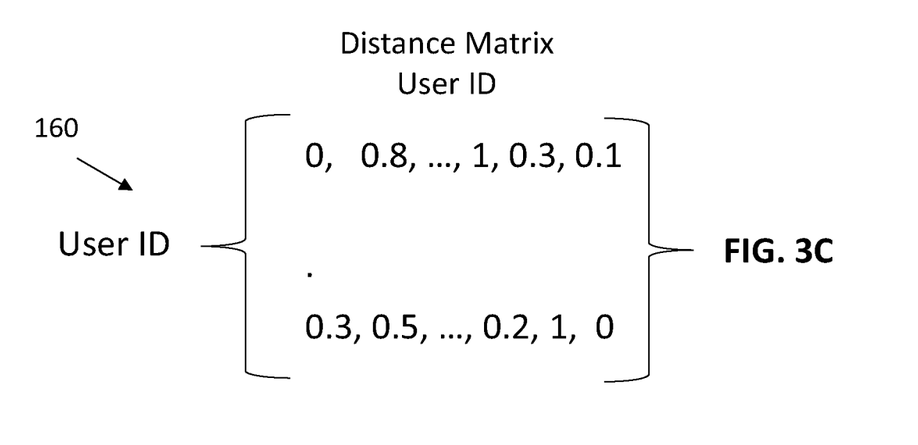

The total or combined distances between the users may be expressed as a distance matrix 160, a highly simplified example of which is shown in FIG. 3C. As seen in FIG. 3C, distance matrix 160 comprises rows and columns of users arranged according to user ID, wherein the matrix entries represent the total distance between any given pair of users, as for example calculated in accordance with equation (1).

Returning to FIG. 2B, as seen at a fourth step 162, users may be grouped into user clusters based on smallest combined distances therebetween. For example, pairs of users with the smallest TotalDist therebetween are considered to belong to a common cluster.

In one preferred embodiment of the present invention, as each cluster is built up and in the case that a largest distance between a potential new cluster member and other users already included in the cluster is less than a predetermined threshold, the potential new cluster member may indeed be added to the cluster. Conversely, if a largest distance between a potential new cluster member and existing cluster members is above the predetermined threshold, the potential new cluster member will be considered as insufficiently similar to other cluster members and not be added to the cluster.

It is understood that the particular cluster generation functionality set forth in FIGS. 2A and 2B is exemplary only, and that other modes of operation for grouping users into clusters based on user similarity, using a combination of user access permission data and user actual access event data are also possible. In some preferred embodiments of the present invention, different weights may be assigned to different matrix nodes based on the relative importance of similarity between users with respect to the features represented by the different matrix nodes. Additionally or alternatively, similarity between users may be evaluated based on additional parameters such as user properties or roles. Similarity with respect to these additional parameters may replace or augment user access permission similarity and user actual access similarity described hereinabove. Further additionally or alternatively, clusters may be narrowed by restricting clusters to very similar users or widened by including users having less similarity to one another.

Returning now to FIG. 1, following the formation of clusters by user cluster generation module 102, cluster permissions are preferably assigned to each cluster by a user cluster permission assignment module 170. User cluster permission assignment module 170 is preferably operative to automatically generate, for each user cluster, a set of cluster permissions, such as cluster permissions A and B respectively assigned to clusters 1 and 2, as indicated at an output 172.

Preferably, the set of cluster permissions output by user cluster permission assignment module 170 comprises user permissions belonging to users who are members of the respective cluster and which are actively used by at least one user member of the cluster. The active use of the user permissions may be based on access permissions actively used during a predetermined learning period of system 100. The active use of access permissions during this period may be derived from the actual access events provided to system 100, by linking actually access resources with the access permissions facilitating such actual access. By way of example, the active use of access permissions may be derived from actual access matrix 140.

Figure 4:
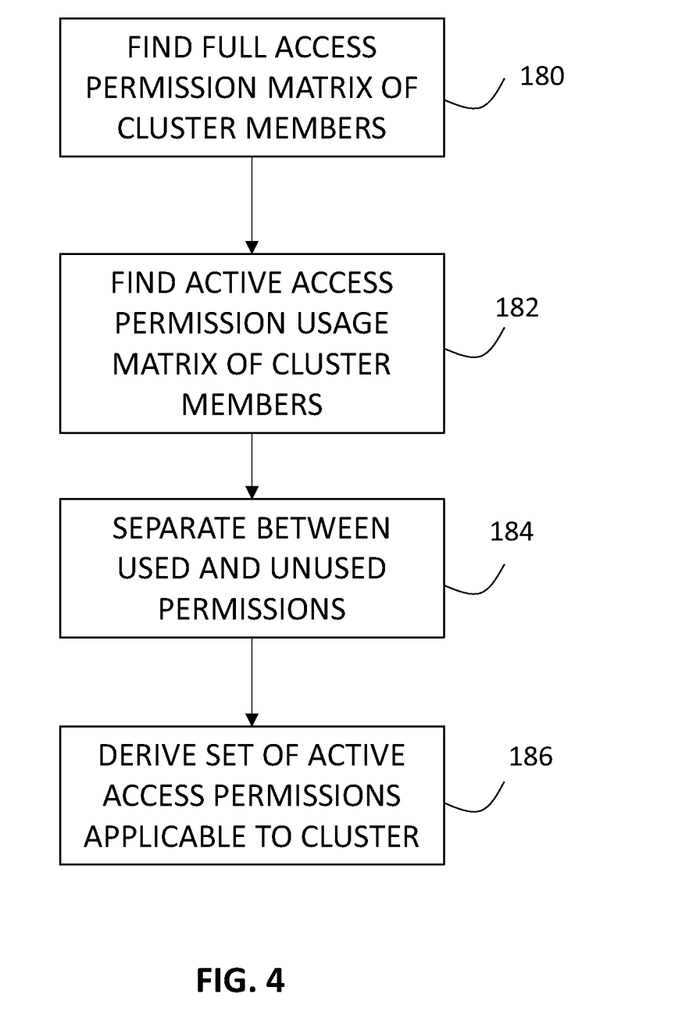
FIG. 4 is a simplified flow chart illustrating user cluster permission assignment functionality of a system of the type shown in FIG. 1.

An exemplary embodiment of the user cluster permission assignment functionality of the present invention may be better understood with reference to the operational flow chart of FIG. 4. It is understood that the user cluster permission assignment functionality shown in FIG. 4 may be performed by user cluster permission assignment module 170, such as shown in FIG. 1.

Turning now to FIG. 4, at a first step 180 a full list of access permissions for users included in the cluster may be found. The full list of access permissions may be in the form of a matrix of cluster permissions. Preferably, the full access permission matrix comprises the full inventory of access permissions belonging to the cluster members. Preferably, the full inventory of access permissions comprises access permissions compiled from every member of the cluster. It is appreciated that the full access permission matrix typically may include access permissions belonging to members of the cluster but no longer used by members of the cluster, for example due to changing roles or tasks within the organization. It is further appreciated that the full access permission matrix is based on access permissions of cluster members and preferably does not take into account access permissions of other users outside of the cluster.

As seen at a second step 182, access permissions actively used by members of the cluster are found. The actively used access permissions may be presented in the form of a matrix of actively used access permissions. For example, the actively used access permissions may correspond to access permissions actively used during a predetermined learning period, in order to access resources by users in the cluster.

In one possible embodiment of the present invention, an access permission may be considered to be actively used if that access permission was actively used by one or more members of the cluster during the monitoring learning period. In another possible embodiment of the present invention, a greater threshold level of use of the access permission is required in order for the access permission to be considered to be actively used, for example, usage of the access permission by a certain number or ratio of cluster members.

As seen at a third step 184, used and unused access permissions may be separated therebetween, in order to build up a set of actively used access permissions applicable to the cluster, as seen at a fourth step 186. By way of example, in the case that the full inventory of axis permissions and the actively used access permissions are each represented by a respective matrix, the used access permissions may be separated from the unused access permissions by comparing the two matrices. Unused access permissions may be removed from the set of access permissions applicable to the cluster.

Additionally or alternatively, in accordance with another preferred embodiment of the present invention, second step 182 may not only distinguish between used and unused access permissions, but may additionally or alternatively distinguish between the level of use of access permissions. In this embodiment, the access permissions actively used by members of the cluster may be differentiated into different levels of access permission usage, such as read only access not involving changes to the resource or access involving changes to the resource. In this case, in addition to separation between used and unused access permissions at third step 184, a further separation may be performed between levels of use of access permissions. Unused levels of access permissions may be removed from the set of access permissions applicable to the cluster without removing the basic access permission itself. For example, a 'read/write' access permission may be changed to a 'read only' access permission and applied to the cluster, in the case that write permissions were found to be unused by members of the cluster during the monitoring period.

Returning to FIG. 1, the set of access permissions found to be applicable to each given cluster is preferably applied to members of the cluster, for example by a user access permission modification module 190. The set of applicable cluster access permissions may be applied to cluster members by automatically modifying the access permissions of cluster members so as to be in accordance with the found set of applicable cluster access permissions. This automatic modification may comprise removing user access permissions which are not included in the set of cluster permissions, adding user access permissions which are included in the set of cluster permissions but not previously granted to the user and changing levels of access permissions of users so as to be in keeping with levels of access permissions included in the set of cluster permissions.

In accordance with one preferred embodiment of the present invention, once the set of cluster permissions has been found, new user groups respectively corresponding to the clusters may be created. Members of each cluster may be placed in each respective corresponding user group and access permissions corresponding to the set of cluster permissions may be granted to the respective corresponding groups.

In accordance with one preferred embodiment of the present invention, user permissions may be automatically modified by system 100, so as to be in keeping with the cluster permissions of the cluster within which the user was grouped. In accordance with another preferred embodiment of the present invention, the set of cluster permissions may be provided in the form of a human-sensible user permission modification recommendation 192 to an administrator for approval 194, prior to the modification of user permissions.

Figure 5:
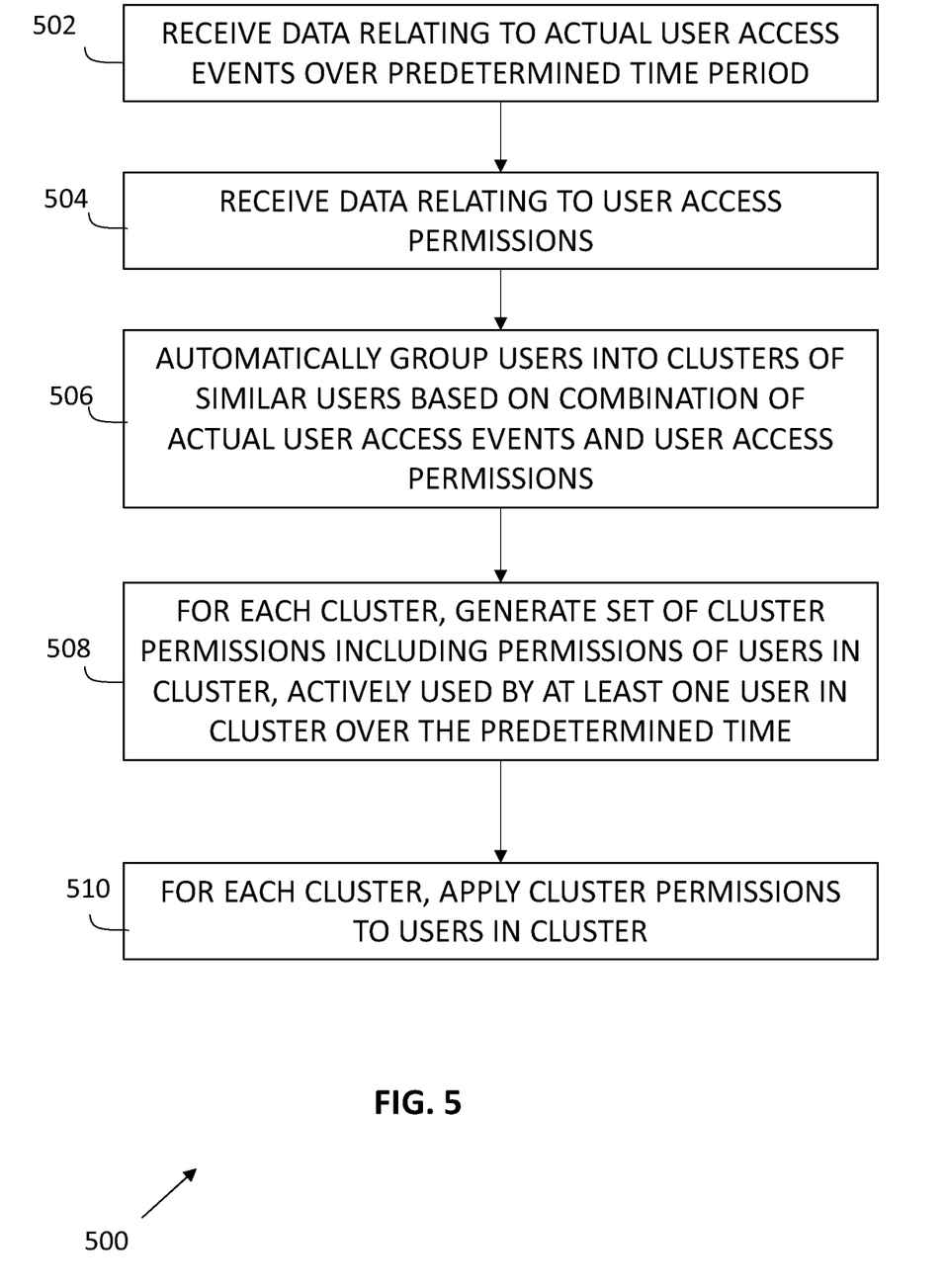
FIG. 5 is a simplified flow chart illustrating steps in a method for automatic management of user permissions, in accordance with a preferred embodiment of the present invention.

Reference is now made to FIG. 5, which is a simplified flow chart illustrating steps in a method for automatic management of user permissions, in accordance with a preferred embodiment of the present invention. By way of example, a method 500 shown in FIG. 5 may be performed by system 100 of FIG. 1.

As seen at a first step 502, data is received relating to actual user access events over a predetermined time period. Such a predetermined time period may be, for example, three months or any other suitable time period over which user access events may be monitored in order to provide data indicative of actual user access to resources within a computer network of an organization.

As seen at a second step 504, data is additionally received relating to access permissions of users. Data relating to user access permissions may include data indicating user membership of access groups within an organization and/or direct access permissions of the user to resources within the organization. Such data may also include data relating to users themselves in order to allow identification of the user for the purpose of unification of user entities, such that a single user may be identified once only and all data associated therewith attributed to that user.

As seen at a third step 506, users are automatically grouped into clusters of similar users, based on taking into account at least one similarity based on a combination of the user access permissions and actual user access events. By way of example only, data relating to user access permissions may be arranged in first matrix and data relating to actual user access events may be arranged in a second matrix. Distances between pairs of users in each of the first and second matrices may be found and subsequently combined for each possible pair of users, thus yielding a combined distance between each pair of users. Users having smallest combined distances therebetween may be considered to be similar to one another and be grouped together in a common user cluster. It is understood that other similarity metrics based on the user access permissions and actual user access events may alternatively be used in order to group similar users into clusters.

As seen at a fourth step 508, following the formation of user clusters at third step 506, a set of user cluster permissions is preferably generated for each cluster. The set of cluster permissions preferably includes cluster permissions of users who are members of the clusters, and which have been actively used by at least one cluster member during the predetermined learning period. The set of cluster permissions thus represents cluster permissions belonging to similar users and which are in active use by at least one of those similar users. In some preferred embodiments of the method of the present invention, generation of the set of cluster permissions may include not only differentiating between actively used and unused access permissions but also differentiating between levels of active use of access permissions, such as read only or read/write access permissions.

As seen at a fifth step 510, the set of cluster permissions found at fourth step 508 is subsequently automatically applied to each individual member of the cluster, such that the member's cluster permissions are modified so as to be in accordance the set of cluster permissions. This may involve granting a user in a cluster additional access permissions not previously granted thereto on the basis of such additional access permissions being included in the set of cluster permissions; revoking a user's access permissions on the basis of such access permissions not being included in the set of cluster permissions; and changing a level of user's access permissions on the basis of the level of those access permissions included in the set of cluster permissions, for example changing a user's access permissions to read only rather than read/write on the basis of the set of cluster permissions including only read only access permissions.

In some preferred embodiments of the present invention fifth step 510 may optionally involve, prior to the automatic modification of access permissions of users, a recommendation of such modification to a system administrator for approval. In this case, the system administrator may review and approve the access permission modification prior to the application thereof to users within the cluster.

It will be appreciated that the systems and methods of the present invention may be embodied as a computer program product. The computer program product may include a computer readable storage medium or media having computer readable program instructions thereon for causing a processor to carry out aspects of the present invention.

It will further be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A method for automatic management of user permissions in an organization comprising:
    automatically grouping users into a plurality of user clusters based on at least one similarity between users in each said user cluster, wherein said automatically grouping comprises:
        generating a first matrix representing access permissions associated with each user;
        generating a second matrix representing resources accessed by said each user during a predetermined period of time preceding said grouping; and
        grouping said users into said user clusters based on combining said first and second matrices,
    for each user cluster, automatically generating a set of cluster user permissions, said set of cluster user permissions comprising user permissions belonging to users in said cluster and actively used by at least one user in said cluster, and for each user cluster, automatically modifying user permissions of each user in said each cluster in accordance with said set of cluster user permissions.

2. The method according to claim 1, wherein said at least one similarity comprises a similarity in access permissions of said users and a similarity in resources accessed by said users, via said access permissions.

3. The method according to claim 1, wherein said combining comprises:

finding distances between respective ones of said users in said first matrix;

finding distances between respective ones of said users in said second matrix;

combining said distances between said respective ones of said users in said first and second matrices, thereby generating a third distance matrix representing combined distances between respective ones of said users in said first and second matrices; and grouping said users into said user clusters based on said combined distances in said third distance matrix.

4. The method according to claim 3, wherein said combining said distances comprises a weighted combining, wherein a greater weight is given to said distances between respective ones of said users in said second matrix in comparison to said first matrix.

5. The method according to claim 1, wherein said access permissions associated with said each user comprise at least one of direct access permissions and membership of user access groups.

6. The method according to claim 1 and also comprising, prior to said generating said first and second matrices:

obtaining data relating to said users and to activity of said users with respect to said resources over said period of time preceding said grouping; and unifying said data relating to said users, in order to avoid user duplication.

7. The method according to claim 6, wherein said unifying is based on comparing unique user identifiers between said users, comprising at least one of user names, user email addresses and user phone numbers.

8. The method according to claim 1, wherein said modifying user permissions comprises at least one of:

granting or revoking user permissions so as to be in accordance with said set of cluster user permissions; and adjusting a level of said user permissions so as to be in accordance with said set of cluster user permissions.

9. The method according to claim 1, wherein said modifying user permissions comprises creating a new cluster having said set of cluster user permissions and populating said new cluster with said users to which said set of cluster user permissions is applicable.

10. The method according to claim 1, wherein:

said first matrix representing access permissions comprises rows of users arranged with respect to columns of access groups and comprises entries indicative of membership of each user of said rows of users with respect to each access group of said columns of access groups; and said second matrix representing resources accessed by said each user comprises rows of users arranged with respect to columns of resources and comprises entries indicative of actual access by each user of said rows of users with respect to each resource of said columns of resources.

11. A method for management of user permissions comprising:

automatically grouping users into a plurality of user clusters based on a similarity between users in each said user cluster wherein said automatically grouping comprises:

generating a first matrix representing access permissions associated with each user;

generating a second matrix representing resources accessed by said each user during a predetermined period of time preceding said grouping; and grouping said users into said user clusters based on combining said first and second matrices, for each user cluster, automatically generating a set of cluster user permissions, said set of cluster user permissions comprising user permissions belonging to users in said cluster and actively used by at least one user in said cluster, and for each user cluster, automatically providing a user-sensible output comprising a recommendation to modify user permissions of each user in accordance with said set of cluster user permissions.

12. A system for automatic management of user permissions in an organization comprising a computer-readable medium storing instructions thereon, which instructions, when executed by a processor, cause the computer to:

automatically group users into a plurality of user clusters based on at least one similarity between users in each said user cluster, by being operative to:

generate a first matrix representing said access permissions associated with each user;

generate a second matrix representing said resources accessed by said each user during a predetermined period of time; and group said users into said user clusters based on a combination of said first and second matrices, for each user cluster, automatically generate a set of cluster user permissions, said set of cluster user permissions comprising user permissions belonging to users in said user cluster and actively used by at least one user in said cluster, and for each user cluster, automatically modify user permissions of each user in said each cluster in accordance with said set of cluster user permissions.

13. The system according to claim 12 wherein said at least one similarity comprises a similarity in access permissions of said users and a similarity in resources accessed by said users, via said access permissions.

14. The system according to claim 12, wherein said instructions, when executed by said processor, further cause said computer to:

find distances between respective ones of said users in said first matrix;

find distances between respective ones of said users in said second matrix;

combine said distances between said respective ones of said users in said first and second matrices, thereby generating a third distance matrix representing combined distances between respective ones of said users in said first and second matrices; and group said users into said user clusters based on said combined distances in said third distance matrix.

15. The system according to claim 14, wherein said instructions, when executed by said processor, further cause said computer to combine said distances in a weighted manner, wherein a greater weight is given to said distances between respective ones of said users in said second matrix in comparison to said first matrix.

16. The system according to claim 13, wherein said access permissions associated with said each user comprise at least one of direct access permissions and membership of user access groups.

17. The system according to claim 13, wherein said instructions, when executed by said processor, further cause said computer to:
obtain data relating to said users and to activity of said users with respect to said resources over said period of time preceding said grouping; and
unify said data relating to said users, in order to avoid user duplication.

18. The system according to claim 12, wherein said instructions, when executed by said processor, further cause said computer to at least one of:
grant or revoke user permissions so as to be in accordance with said set of cluster user permissions; and
adjust a level of said user permissions so as to be in accordance with said set of cluster user permissions.

19. The system according to claim 12, wherein said instructions, when executed by said processor, further cause said computer to modify said user permissions by creating a new cluster having said set of cluster user permissions and to populate said new cluster with said users to which said set of cluster user permissions is applicable.

20. The system according to claim 12, wherein:
said first matrix representing access permissions comprises rows of users arranged with respect to columns of access groups and comprises entries indicative of membership of each user of said rows of users with respect to each access group of said columns of access groups; and
said second matrix representing resources accessed by said each user comprises rows of users arranged with respect to columns of resources and comprises entries indicative of actual access by each user of said rows of users with respect to each resource of said columns of resources.

* * * * *